United States Patent [19]
Masaki

[11] Patent Number: 5,899,550
[45] Date of Patent: May 4, 1999

[54] DISPLAY DEVICE HAVING DIFFERENT ARRANGEMENTS OF LARGER AND SMALLER SUB-COLOR PIXELS

[75] Inventor: Yuichi Masaki, Kawasaki, Japan

[73] Assignee: Canon Kabushiki Kaisha, Tokyo, Japan

[21] Appl. No.: 08/917,565

[22] Filed: Aug. 26, 1997

[30] Foreign Application Priority Data

Aug. 26, 1996 [JP] Japan .................................. 8-224163

[51] Int. Cl.⁶ ........................ G02F 1/1335; G02F 1/1343
[52] U.S. Cl. ........................ 349/109; 349/106; 349/108; 349/144
[58] Field of Search .................... 349/106, 109, 349/108, 144

[56] References Cited

U.S. PATENT DOCUMENTS

| | | | |
|---|---|---|---|
| 4,569,574 | 2/1986 | Masaki et al. | 350/334 |
| 4,572,617 | 2/1986 | Masaki et al. | 350/339 R |
| 4,593,978 | 6/1986 | Mourey et al. | 350/339 |
| 4,812,017 | 3/1989 | Piper | 350/333 |
| 5,144,288 | 9/1992 | Hamada et al. | 349/145 |
| 5,150,240 | 9/1992 | Kim | 359/87 |
| 5,177,627 | 1/1993 | Ishiwata et al. | 359/68 |
| 5,235,447 | 8/1993 | Hepp et al. | 359/54 |
| 5,438,442 | 8/1995 | Katakura | 359/54 |
| 5,461,503 | 10/1995 | Deffontaines et al. | 359/68 |
| 5,530,570 | 6/1996 | Terumoto | 359/68 |
| 5,602,658 | 2/1997 | Ezra et al. | 349/145 |
| 5,642,176 | 6/1997 | Abukawa et al. | 349/106 |
| 5,757,452 | 5/1998 | Masaki et al. | 349/110 |
| 5,760,857 | 6/1998 | Yanagawa et al. | 349/43 |
| 5,777,707 | 7/1998 | Masaki et al. | 349/110 |

FOREIGN PATENT DOCUMENTS

| | | |
|---|---|---|
| 0261898 A2 | 3/1988 | European Pat. Off. . |
| 0361981 A2 | 9/1988 | European Pat. Off. . |
| 0453033 A1 | 10/1991 | European Pat. Off. . |
| 0703562 | 3/1996 | European Pat. Off. . |

Primary Examiner—William L. Sikes
Assistant Examiner—Tarifur R. Chowdhury
Attorney, Agent, or Firm—Fitzpatrick, Cella, Harper & Scinto

[57] ABSTRACT

A display device includes a multiplicity of pixels arranged in a matrix of rows and columns, each pixel including a plurality of color pixels each divided into a plurality of sub-color pixels having mutually different areas. The plurality of sub-color pixels are arranged in the row or column direction in different manners for at least two of said plurality of color pixels. As a result, the sub-color pixels may be arranged so that, when the respective color pixels are driven to display an identical gradation level, a ratio of a row-direction line width to a column-direction line width is closer to 1 than the ratio obtained when all the color pixels have an identical sub-color pixel arrangement, whereby numerals and characters, for example, can be displayed at an improved display quality.

28 Claims, 9 Drawing Sheets

DISPLAY DEVICE HAVING DIFFERENT ARRANGEMENTS OF LARGER AND SMALLER SUB-COLOR PIXELS

FIELD OF THE INVENTION AND RELATED ART

The present invention relates to a display device of the type wherein an increased number of display colors are realized by pixel division and particularly an improvement in such a display device.

As a type of known display devices, a liquid crystal device comprising a pair of transparent substrates and a liquid crystal disposed therebetween, such as a ferroelectric liquid crystal (hereinafter indicated as "FLC") or a bistable nematic liquid crystal (hereinafter indicated as "BTN"), has been known to have advantageous characteristics, such as a wide viewing angle and a high-speed responsiveness, so that it is expected to be used as a large-area and a high-definition display as a monitor for a personal computer, etc. in place of conventional CRTs, taking advantage of such characteristics.

However, as FLC or BTN can only have two stable states (or so-called bistable states) in switching operation, such a liquid crystal device can only display a smaller number of colors than a CRT when used in place of a CRT. Accordingly, for a liquid crystal, such as FLC or BTN, capable assuming only binary display states, there has been adopted a technique of dividing a display pixel having a certain area into a plurality of sub-pixels each having a smaller area so as to allow a gradational display for displaying an increased number of display colors. This technique is also applicable to another display device, such as a plasma display device.

FIGS. 12 and 13 illustrate an example of such pixel division. Referring to FIGS. 12 and 13, a substrate 2 is provided with color filters 11, 12 and 13 forming three color pixels of red, green and blue, and the red filter 11, the green filter 12 and the blue filter 13 are coated with a protective film 3. Further, transparent display electrodes 15R, 15G and 15B are disposed thereon corresponding to the red filter 11, green filter 12 and blue filter 13. Further, the display electrodes 15R, 15G and 15B are respectively divided into larger split electrodes 15R1, 15G1 and 15B1 and smaller split electrodes 15R2, 15G2 and 15B2 in an areal ratio of 3:2 for each color so as to allow a gradational display.

Further, the split electrodes 15R1, 15G1, 15B1, 15R2, 15G2 and 15B2 are respectively provided with metal electrodes 16R1, 16G1, 16B1, 16R2, 16G2 and 16B2 as auxiliary electrodes or wires. As a result, one pixel 100 including the totally 6 split electrodes and the red filter 11, green filter 12 and blue filter 13 can effect a color display of 64 colors. Such a pixel 100 is arranged in a matrix form, and red, green and blue pixels formed corresponding to the red filter 11, green filter 12 and blue filter 13 are respectively divided into sub-color pixels having mutually different areas formed corresponding to the split electrodes 15R1 and 15R2, 15G1 and 15G2, and 15B1 and 15B2.

In such a conventional liquid crystal device using pixel division for gradational display, however, because of a luminance difference among red, green and blue, a peculiar display pattern or shape is recognized to human eyes in a certain display combination of the split electrodes. For example, in case of displaying a longitudinal line and a lateral line by turning on only sub-color pixels corresponding to the larger split electrodes 15R1, 15G1 and 15B1 on a display, a white longitudinal line L1 and a white lateral line L2 are displayed on a black background as shown in FIG. 14 but they are apparently recognized as having substantially different widths (i.e., a larger width of L1 and a smaller width of L2). Incidentally, when a gradation level is considered, these lines are gray but are recognized as almost white.

The above phenomenon of different width is caused by a linear arrangement of on-split electrodes 15R1, 15G1 and 15B1 in one pixel as shown in FIG. 15 resulting in a difference between a width 17 of the laterally extending line L2 and a width 18 of the longitudinally extending line L1. If the longitudinal line and the lateral lines are recognized as having different widths (18 and 17) as mentioned above, the display quality is deteriorated such that, e.g., a Gothic-type character can be recognized as a Ming-type character.

SUMMARY OF THE INVENTION

Accordingly, in order to solve the above-mentioned problem of the prior art, an object of the present invention is to provide a display device capable of improving the display quality.

According to the present invention, there is provided a display device comprising a multiplicity of pixels arranged in a matrix of rows and columns, each pixel comprising a plurality of color pixels each divided into a plurality of sub-color pixels having mutually different areas, wherein said plurality of sub-color pixels are arranged in the row or column direction in different manners for at least two of said plurality of color pixels.

In a preferred embodiment, the plurality of color pixels may be arranged on a common row, and the arrangement of the sub-color pixels in the column direction is made different for the at least two of the plurality of color pixels, so that data electrodes may be provided with a simple electrode pattern to avoid a decrease in aperture rate.

Sub-color pixels having substantially identical areas may be selected simultaneously, and sub-color pixels having different areas may be selected in different scanning selection periods, so that a common data line may be used for sub-color pixels having different areas to provide an improved aperture rate.

If all the sub-color pixels constituting one pixel are selected simultaneously, an increased picture rewrite frequency may be attained.

In case of displaying an identical gradation level with the respective color pixels along one row and one column, if a ratio (Rs) between the width of an ON-state line of the color pixels in the row direction and the width of an ON-state line of the color pixels in the column direction is closer to 1 than the ratio when obtained by displaying the identical gradation level by using a set of color pixels all having an identical sub-color pixel arrangement, it is possible to display easy-to-see numerals and characters.

If the ratio (Rs) between the ON-state lines in the row direction and in the column direction is larger than 0.6, preferably 0.7 or larger, numerals and characters are clearly viewed. In case of using large-size sub-color pixels, a ratio Rs closer to 1 provides an easier-to-see numeral or character.

The color filter pattern alignment may become easier if a color filter layer is not split between the respective sub-color pixels in each color pixel.

Each pixel may preferably be in a square shape having a length-to-breadth ratio of ca. 1 so that characters and numerals may be viewed clearly.

It is preferred to design color pixels so that all the color pixels have an identical number of displayable gradation levels so as to provide a good white balance.

In order to allow an easier recognition of the ON-state line widths in the row and column directions identically, it is preferred to provide a different sub-color pixel arrangement for green color pixels from those for the other color pixels.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
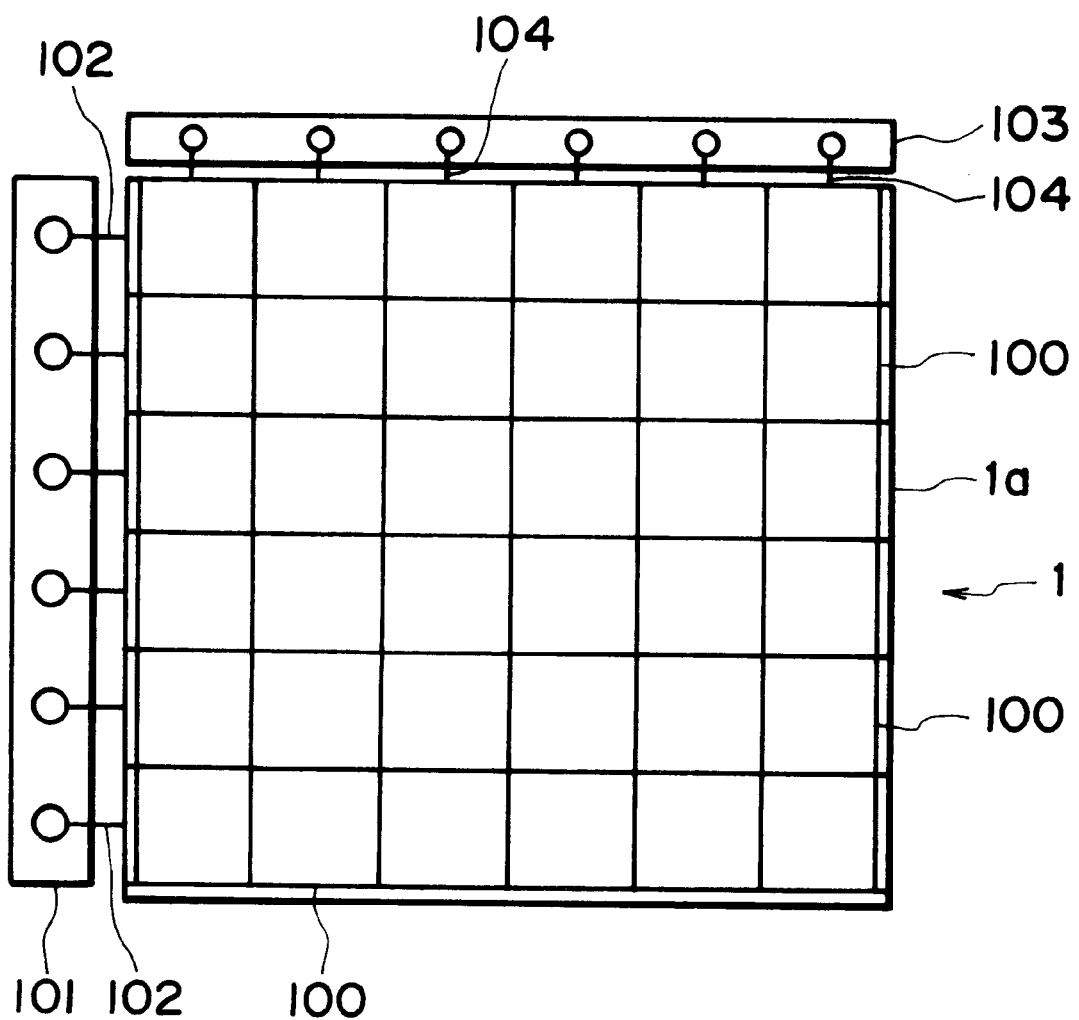
FIG. 1 is a plan view for illustrating an organization of a display device according to a first embodiment of the invention.

FIG. 1 is a schematic plan view of a liquid crystal display device (liquid crystal display panel) according to a first embodiment of the present invention for illustration of an organization of the liquid crystal device. Referring to FIG. 1, a liquid crystal device 1 constituting a display panel includes a scanning line driver 101 for selecting individual scanning lines 102 and supplying a scanning selection signal (having a prescribed waveform) to a selected scanning line 102 at a prescribed time, and a data line driver 103 for supplying data signals (having prescribed waveforms) depending on a video input signal to respective data lines 104. FIG. 1 schematically shows totally 36 pixels 100 arranged in a 6×6-matrix, but an actual panel may have a multiplicity of pixels such as 400×200 pixels, 640× 480pixels and 1280×1024 pixels.

The multiplicity of pixels arranged in a matrix are supplied with data signals from the data lines 104 and a scanning signal from the scanning lines 102. FIG. 1 schematically show 6 scanning lines and 6 data lines but, as each pixel 100 comprises 3 color pixels and each color pixel comprises 2 sub-color pixels in this embodiment as will be described later, the panel including 6×6 pixels actually requires 12 scanning lines and 36 data lines.

Figure 2:
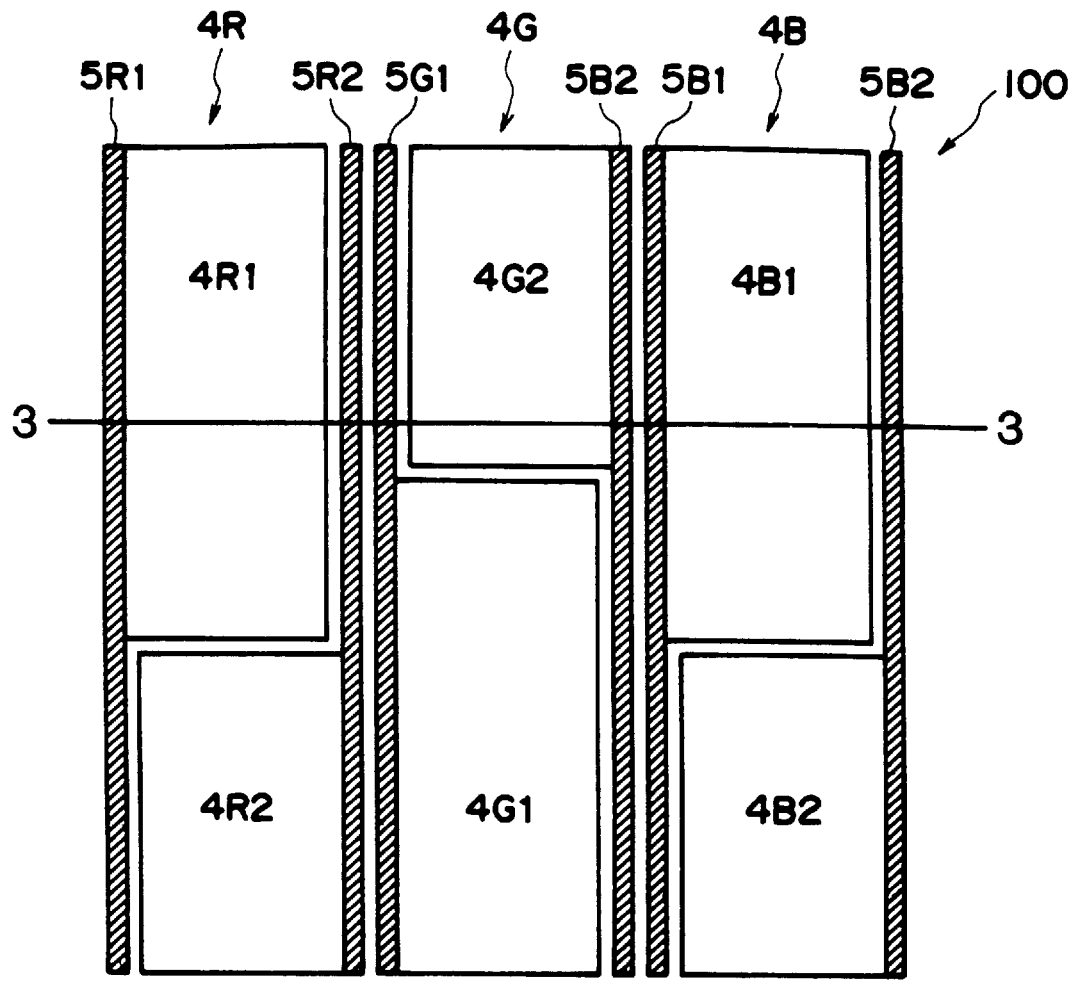
FIG. 2 is a plan view of one pixel having a two-split electrode pattern in a display device according to an embodiment of the invention.
Figure 3:
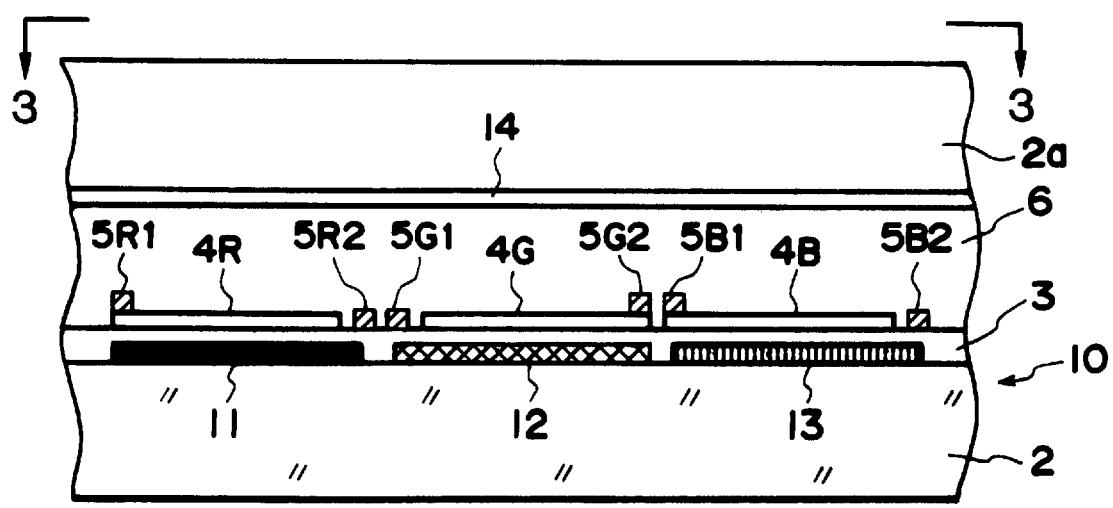
FIG. 3 is a sectional view of the display device taken along a line 3—3 in FIG. 2.

FIG. 2 is a plan view of one pixel having a square shape, i.e., a length-to-breadth ratio of 1, in the liquid crystal display panel 1, and FIG. 3 is a sectional view thereof taken along line 3—3 in FIG. 2. Referring to FIGS. 2 and 3, the liquid crystal panel corresponding to one pixel includes an e.g., 1.5 $\mu$m-thick color filter layer 10 comprising three color filter segments of a red filter 11, a green filter 12 and a blue filter 13 each comprising a resin with a pigment of the relevant color dispersed therein, formed on a glass substrate 2. The color filters 11, 12 and 13 are coated with a protective film 3. On the protective film 3, transparent display electrodes 4R, 4G and 4B are formed in alignment with the color filters 11, 12 and 13, respectively. Along both sides of the display electrodes 4R, 4G and 4B, metal electrodes 5R1, 5G1, 5B1, 5R2, 5G2 and 5B2 are disposed as auxiliary wires or electrodes. The metal electrodes may for example comprise a 150 nm-thick molybdenum film (stripe).

The display electrodes 4R, 4G and 4B may be formed as, e.g., 100 nm-thick film stripes of ITO as transparent electrodes by sputtering and photolithography so as to be split in a prescribed ratio, respectively, in alignment with the red filter 11, green filter 12 and blue filter 13, respectively.

Referring to FIG. 3, a glass substrate 2a disposed opposite to the substrate 2 for sandwiching a liquid crystal 6, such as FLC or BTN together with the substrate 2, is also provided with split display electrodes 14. Both substrates may also be provided with an alignment film (not shown) for covering the display electrodes 4R, 4G, 4B, and electrodes 14.

As a first example of this embodiment, each of the display electrodes 4R, 4G and 4B is divided into split electrodes in a ratio of 3:2, respectively, so as to provide larger-area split electrodes 4R1, 4G1 and 4B1, and smaller-area split electrodes 4R2, 4G2 and 4B2, each corresponding to a sub-color pixel.

According to this embodiment, at least one (i.e., one or two) of the display electrodes 4R, 4G and 4B is designed to have an order of arrangement of larger and smaller split electrodes which is different from the order of arrangement of larger and smaller split electrodes for the remainder of the display electrodes. Now, a spectral luminous efficiency to the human eye is maximum at a green wavelength, and the luminance of green is the largest among the red R, green G and blue B. Accordingly, in this embodiment, the order of arrangement of a larger split electrode 4G1 and a smaller split electrode 4G2 for the display electrode 4G aligned with the green filter 12 is made reverse to the order of arrangements of larger split electrodes 4R1 (and 4B1) and smaller split electrodes 4R2 (and 4B2). According to this arrangement, the deviation between a luminance center and an areal center for one pixel can be minimized.

Figure 4:
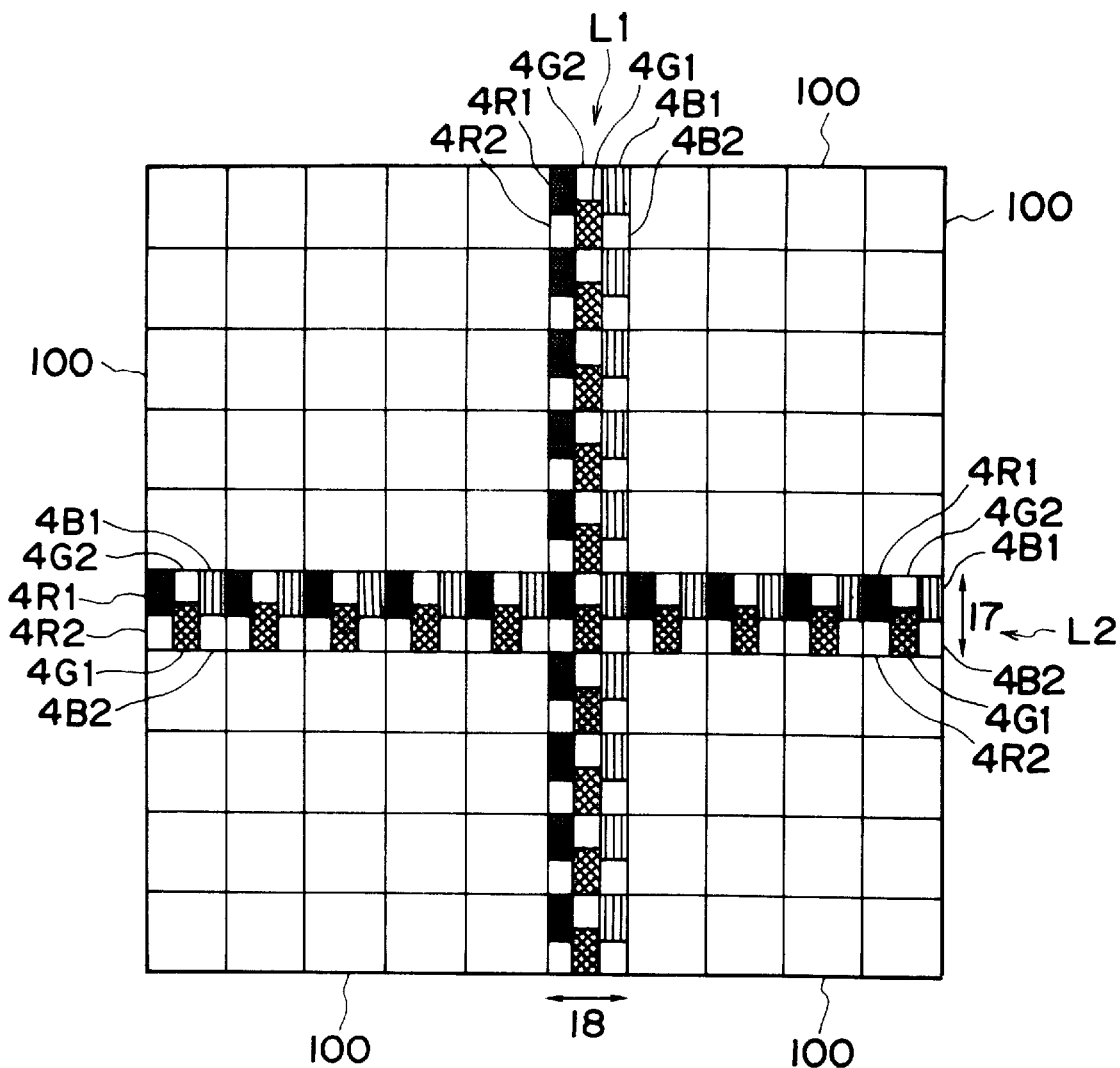
FIG. 4 illustrates a pattern of turned-on sub-color pixels for displaying a prescribed certain display pattern.

As a result of the reverse order of arrangement of the slit electrodes 4G1 and 4G2 of the display electrode 4G aligned with the green filter 12 with respect to that of the other display electrodes 4R and 4G, when only larger-area split electrodes are turned on, the resultant ON-state sub-color pixels 4R1, 4G1 and 4B1 are aligned as shown in FIG. 4, so that the difference between ON-state line-widths L1 and L2 in the row and column directions can be obviated.

Now, a process for producing a liquid crystal panel 1 having an organization as described above will be described.

Figure 5:
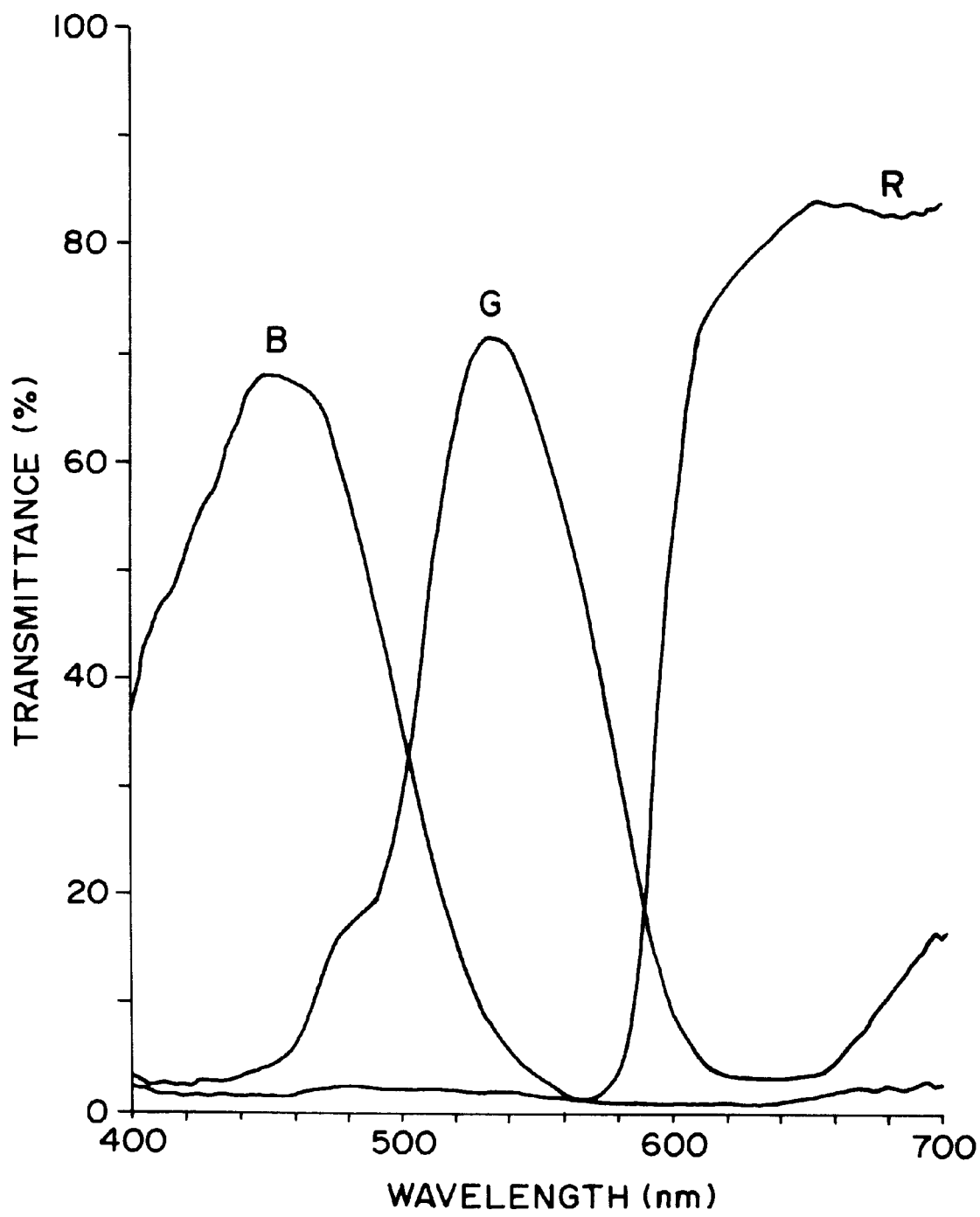
FIG. 5 is a graph showing spectral transmittance characteristics of color filters (color filter segments).

First of all, one glass substrate 2 is provided with a color filter layer including red (R) filters 11, green (G) filters 12 and blue (B) filters 13 colored by pigment dispersion, dyeing or electrochemical deposition. The spectral transmittance characteristics of the color filters (R, G and B) are shown in FIG. 5. Then, the color filters 11, 12 and 13 are then coated with a protective film 3 and with an ITO film, which is then patterned by photolithography to form display electrodes 4R, 4G and 4B. The display electrodes 4R, 4G and 4B are formed in alignment with the red filter 11, green filter 12 and blue filter 13, respectively, and each divided in an areal ratio of 3:2 so as to provide split electrodes 4R1, 4R2, 4G1, 4G2, 4B1 and 4B2.

Then, along both sides respectively of the display electrodes 4R, 4G and 4B, metal electrodes 5R1, 5G1, 5B1, 5R2, 5G2 and 5B2 are disposed to prepare a substrate 2 (segment plate).

Then, another glass substrate is provided with a pattern of scanning electrodes for scanning the pixels 100 so as to be aligned with the display electrodes in similar processes to provide a substrate 2a (common plate).

Then, these two substrates 2 and 2a are respectively provided with a short circuit-preventing film of, e.g., tantalum oxide and an alignment film of, e.g., polyimide, followed by rubbing in one direction so as to provide a pretilt angle (contact angle of liquid crystal molecules with respect to the alignment film) of, e.g., 20 deg.

Then, the two substrates 2 and 2a are applied to each other with 1.5 $\mu$m-dia. spacer beads ("Shinshikyu"(trade name), available from Shokubai Kasei K.K.) so that their rubbing directions are identical to each other, followed by sealing of the periphery with an adhesive to prepare a blank panel.

Then, the panel is filled with a chiral smectic liquid crystal capable of exhibiting ferroelectricity heated in isotropic phase, followed by sealing of the injection port and gradual cooling to room temperature for providing a smectic phase, thereby completing a liquid crystal display panel 1.

The above-described liquid crystal display panel may be driven in a multiplex manner by using one scanning line for one pixel and 6 data lines for one pixel. More specifically, in one horizontal scanning period (IH period), a scanning selection signal is supplied to one scanning line from a scanning line driver and, in synchronism therewith, the six data lines for one pixel are simultaneously supplied with data signals each for determining an ON-state or an OFF-state of each sub-color pixel from a data line drive.

By repeating an operation as described above a number of times necessary for covering all the scanning lines to display a one-frame picture.

It is also possible to connect a single data line for two sub-color pixels of each color pixel so as to reduce the number of data lines for one pixel to 3. In this case, two scanning lines may be used for one pixel so that one of them is connected commonly to 3 larger-area sub-color pixels and the other is connected commonly to 3 smaller-area sub-color pixels. As a result, the total number of data lines and scanning lines necessary for driving one pixel can be reduced from 7 to 5, so that the aperture rate of the panel can be increased correspondingly. However, one-frame period for selecting all the scanning lines is prolonged in this case. Accordingly, it is preferred to suppress the flicker by dividing one frame period into two fields, selecting one scanning line in a former field to determine the display states of the larger-area sub-color pixels, and selecting the other scanning line in a subsequent field to determine the display states of the smaller-area sub-color pixels. Details of such a multiplex drive method for a ferroelectric liquid crystal device are described, e.g., in EP-A 703562.

By using the above-described display panel, when only the sub-color pixels corresponding to the larger-area split electrodes 4R1, 4G1 and 4B1, the width 17 of a lateral line L2 of ON-state sub-color pixels and the width 18 of a longitudinal line LI of ON-state sub-color pixels are made equal to each other, i.e., providing a ratio between line widths 17 and 18 of 1:1=1.

Figure 12:
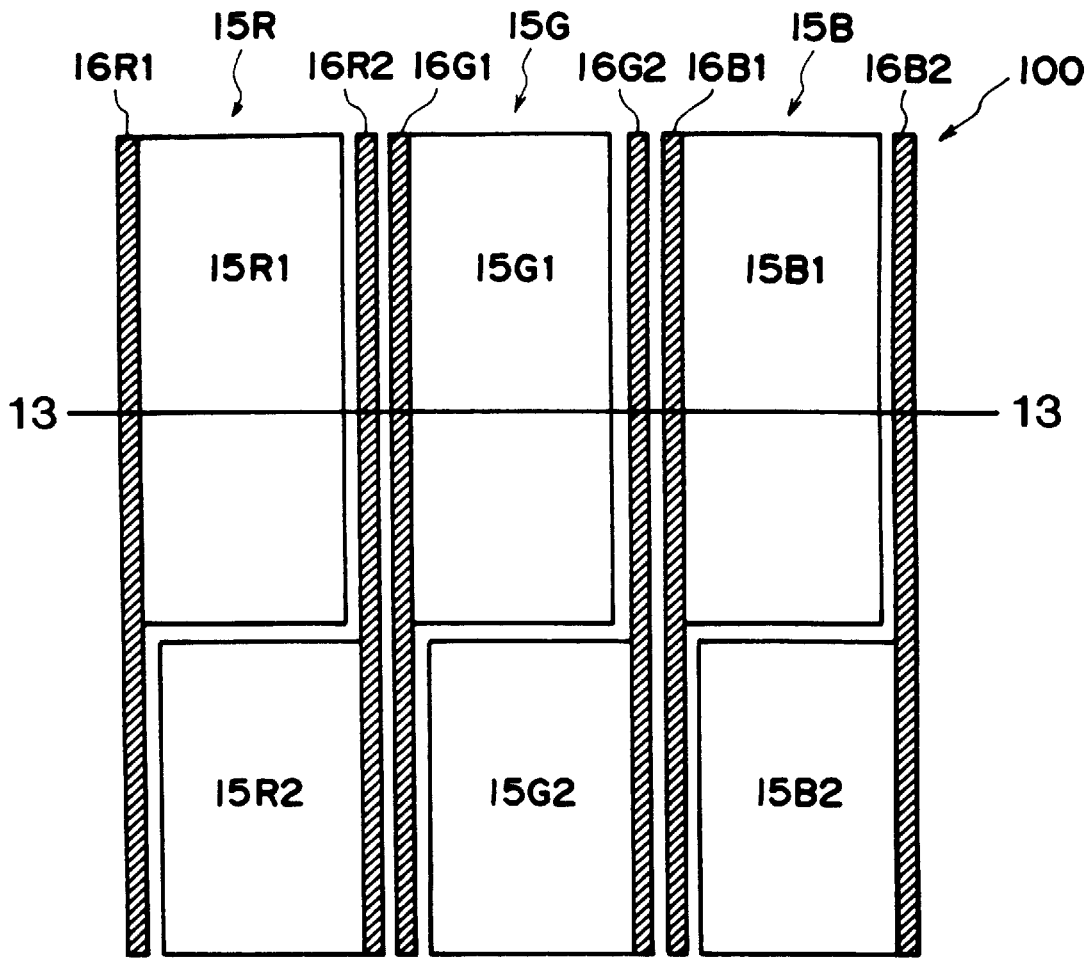
FIG. 12 is a plan view of one pixel having a two-split electrode pattern in a known display device.
Figure 13:
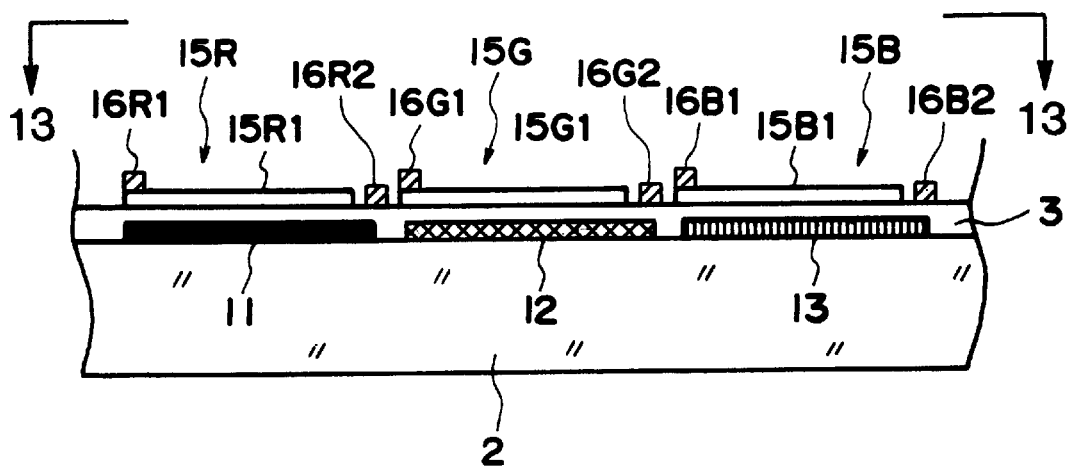
FIG. 13 is a sectional view of the display device taken along line 13—13 in FIG. 12.
Figure 14:
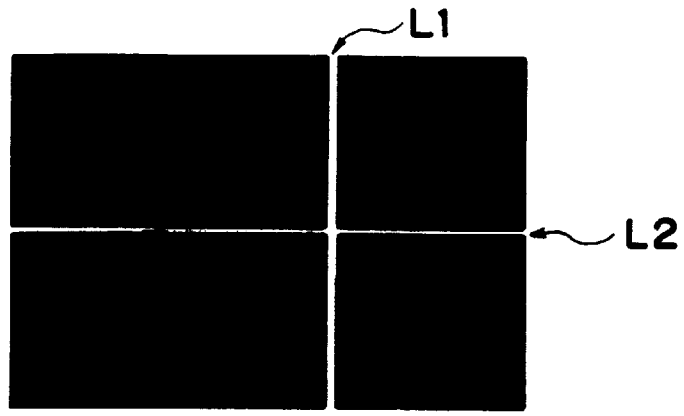
FIG. 14 is a plan view of a certain display picture on the display device in the known display device.
Figure 15:
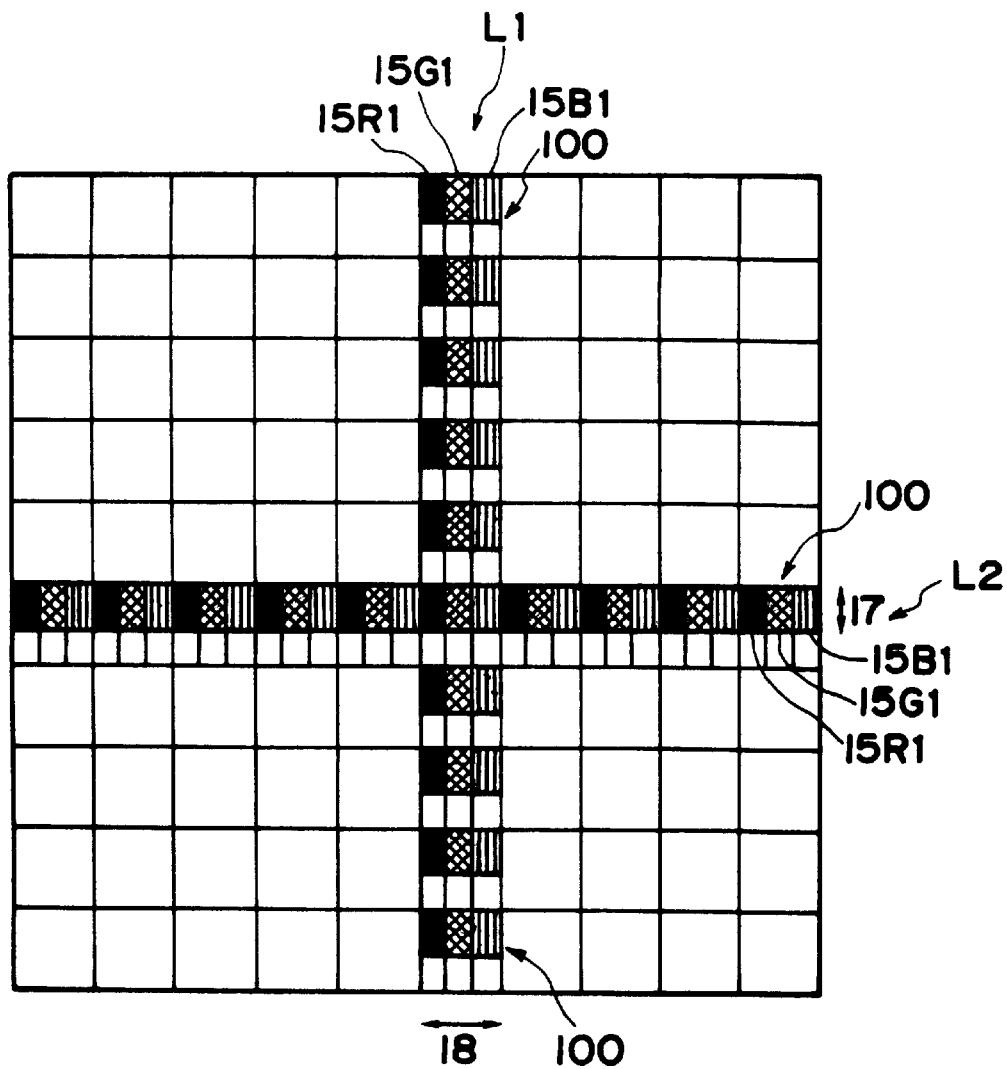
FIG. 15 is a schematic illustration of turned-on sub-color pixels providing the display picture shown in FIG. 14.

In contrast thereto, in the case of a similar display by using the sub-color pixel arrangement shown in FIG. 12, the ratio between line widths 17 and 18 is 0.6:1.00=0.6.

Thus, the sub-color pixel arrangement shown in FIG. 2 provides a ratio concerned closer to 1 than the sub-color pixel arrangement shown in FIG. 12 adopting an identical sub-color pixel arrangement for each color pixel.

Next, a second embodiment of the present invention will be described.

Figure 7:
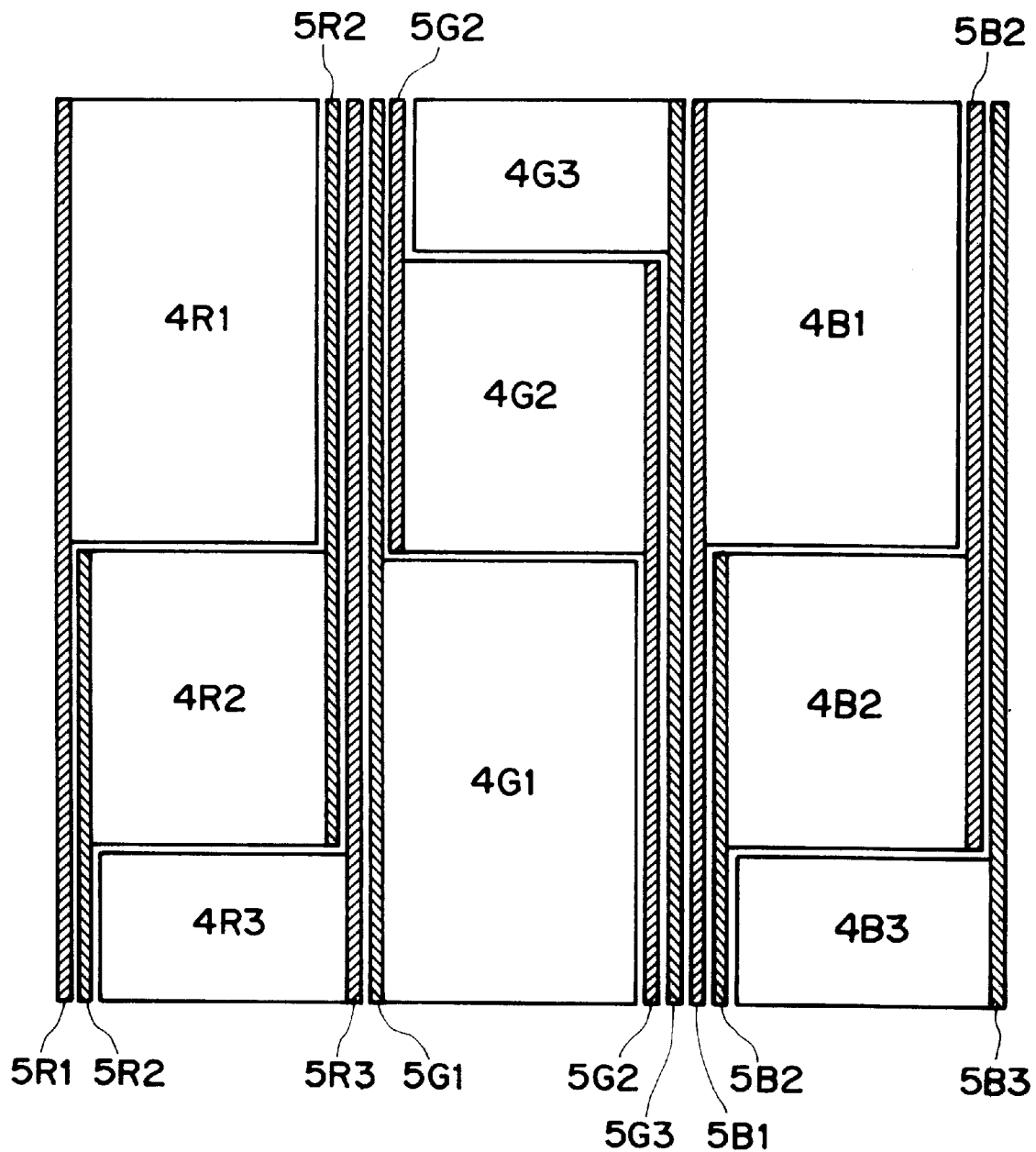
FIG. 7 is a plan view of one pixel having a three-split electrode pattern in a display device according to another embodiment of the invention.

FIG. 7 shows one substantially square pixel having a length-to-breadth ratio of ca. 1, wherein each display electrodes 4R, 4G and 4B is divided into three split electrodes having areal ratios of 1:2:3. More specifically, referring to FIG. 7, the data electrode 4R aligned with a red filter is divided into a largest-area split electrode 4R1, a medium-area split electrode 4R2 and a smallest-area split electrode 4R3; the display electrode 4G aligned with a green filter is divided into a largest-area split electrode 4G1, a medium-area split electrode 4G2 and a smallest-area split electrode 4G2; and the display electrode 4B aligned with a blue filter is divided into a largest-area split electrode 4B1, a medium-area split electrode 4B2 and a smallest-area 4B3.

Further, metal electrodes (auxiliary electrodes) 5R1, 5G1 and 5B1 are disposed along the sides of the split electrodes 4R1, 4G1 and 4B1, respectively; metal electrodes 5R2, 5G2 and 5B2, the sides of the split electrodes 4R2, 4G2 and 4B2; and metal electrodes 5R3, 5G2 and 5B3, the sides of the split electrodes 4R3, 4G3 and 4B3.

Figure 6:
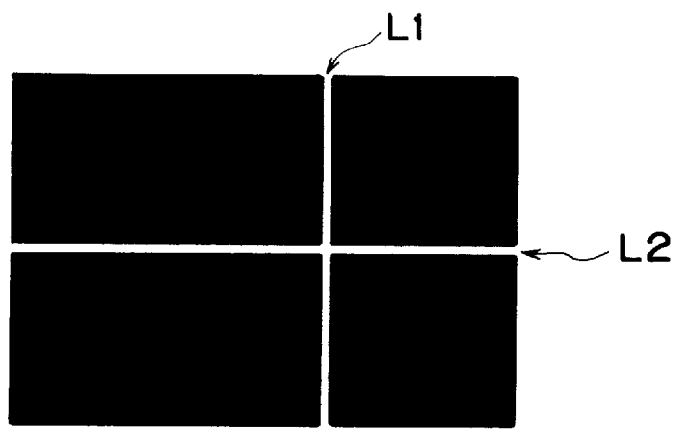
FIG. 6 illustrates a display picture on the display device corresponding to FIG. 4.

When a display device having the above-mentioned sub-color pixel arrangement is used for displaying a longitudinal line L1 and a lateral line L2 as shown in FIG. 6, only the case of turning on only sub-color pixels corresponding to the split electrodes 4R2, 4G2 and 4B2 results in a difference between a lateral line width and a longitudinal line width providing a ratio of 0.67:1.00.

In contrast thereto, for a display device having a green sub-color pixel arrangement identical to the red sub-color pixel arrangement and blue sub-color pixel arrangement, the lateral/longitudinal line width ratio becomes 0.33:1.0.

Accordingly, the arrangement of FIG. 7 according to the present invention provides a clearer display of numerals and characters.

In the embodiment of FIG. 7, if the position of the split electrodes 4B2 and 4B3 are replaced with each other, the lateral/longitudinal line width ratio will be increased to 0.83:1.0. The same effect is attained also by replacing the positions of the split electrodes 4R2 and 4R3 with each other.

Further, in the embodiment of FIG. 7, if the split electrodes 4G2 and 4G3 ar made by not a lateral division as shown in FIG. 7 but by a longitudinal division, the lateral/longitudinal line width ratio will again increase to 0.83:1.0.

Figure 8:
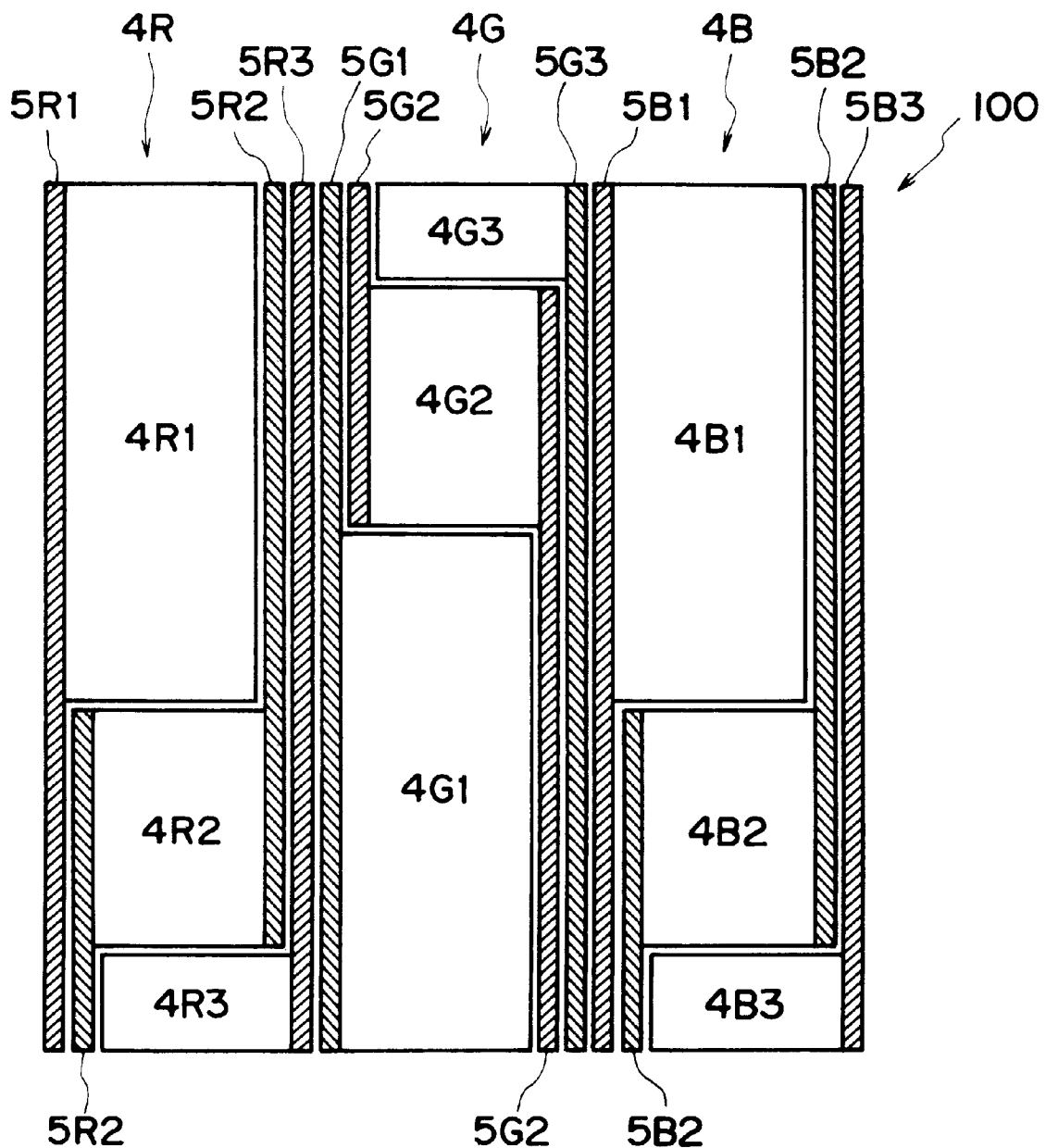
FIGS. 8–11 are respectively a plan view of one pixel having a different split electrode pattern according to still another embodiment of the invention.

FIG. 8 shows another embodiment of square pixel division, wherein each color pixel is divided into three sub-color pixels having areal ratios of 1:2:4 so as to increase the number of displayable gradation levels to 8 for each color.

In this embodiment, a lateral/longitudinal line width difference arises only in the case of turning on only split electrodes 4R2 4G2 and 4B2, which provides a lateral/longitudinal line width ratio of 0.71:1.00.

However, if a display device having a green sub-color pixel arrangement identical to those of the other sub-color pixels is used, the lateral/longitudinal line width ratio becomes 0.29:1.00.

Thus, the arrangement of FIG. 8 according to the present invention again provides a clearer display of numerals and characters.

The positional exchange between the split electrodes 4B2 and 4B3 in the embodiment of FIG. 8 will provide an increased lateral/longitudinal line width ratio of 0.86:1.0, which is also attained by the positional exchange between the split electrodes 4R2 and 4R3.

Further, in the embodiment of FIG. 8, if the split electrodes 4G2 and 4G3 are made by not a lateral division as shown in FIG. 8 but by a longitudinal division, the lateral/longitudinal line width ratio will again increase to 0.86:1.00.

Figure 9:
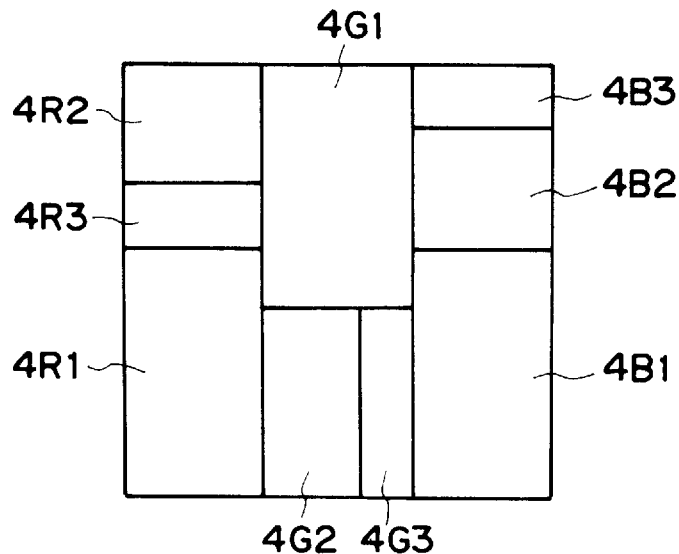

FIG. 9 shows another embodiment of square pixel division which includes identical sub-color pixels but in an different arrangement and equally allows 8 gradation levels for each color compared with the embodiment of FIG. 8. In this embodiment, the lateral/longitudinal line width ratio becomes 1 at any gradation levels.

The above explanation has been made with reference to a pixel comprising three color pixels of red, green and blue, but the present invention is also applicable to a pixel including four color pixels of red, green, blue and white. In the case of application to such a pixel including four color pixels, display electrodes are formed in alignment with four color filters, and at least the split electrodes for green may be arranged opposite to the split electrode arrangement for the remaining colors.

Figure 10:
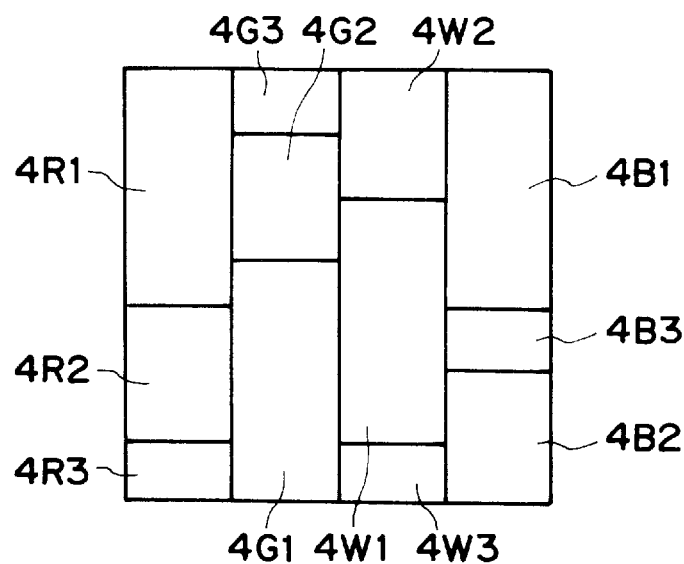

FIG. 10 shows another embodiment of square pixel division, wherein one pixel includes a white color pixel lacking a colored filter layer in addition to red, green and blue color pixels aligned with colored filters. More specifically, a white color pixel includes a largest-area sub-color pixel 4W1, a medium-area sub-color pixel 3W2 and a smallest-area sub-color pixel 4W3 having areal ratios of 4:2:1 similarly as the other color pixels and so as to allow 8 gradation levels for each color.

Figure 11:
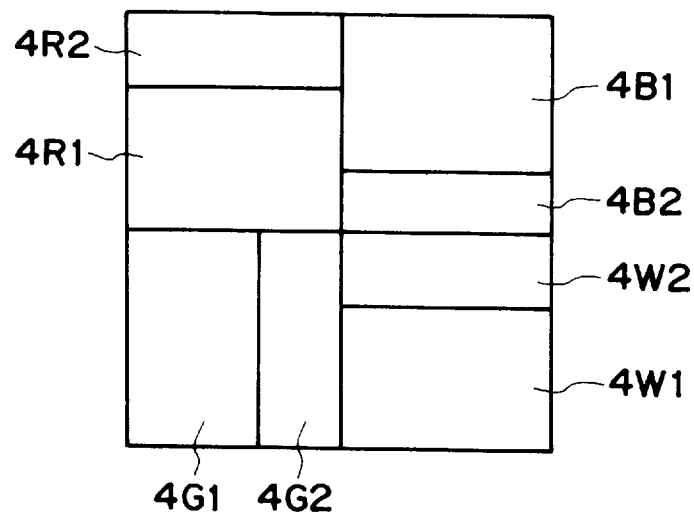

FIG. 11 shows still another embodiment of square pixel division, wherein one square pixel is divided into four color pixels arranged in a matrix of 2×2. The respective color pixels include larger-area sub-color pixels 4R1, 4G1, 4B1 and 4W1 and smaller-area sub-color pixels 4R2, 4G2, 4B2 and 4W2, having an area ratio of 2:1, respectively.

Hereinbelow, some production examples are set forth.

EXAMPLE 1

A liquid crystal display panel having a structure as explained with reference to FIGS. 2 and 3 was prepared in the following manner.

A glass substrate 2 was subjected to 3 cycles each including formation of a colored photosensitive resin film with a pigment dispersed therein and patterning of the film to form a color filter layer including red filters 11, green filters 12 and blue filters 13, which showed spectral transmittance curves R, G and B, respectively, as shown in FIG. 5.

The color filters 11, 12 and 13 were further coated with a silicon oxide film and then with an ITO film formed by sputtering, followed by patterning into display electrodes 4R, 4G and 4B, which were formed in alignment with the red filters 11, green filters 12 and blue filters 13, respectively, and were each divided into two split electrodes having an areal ratio of 3:2.

Along the sides of the display electrodes 4R, 4G and 4B, metal electrodes 5R1, 5G1, 5B1, 5R2, 5G2 and 5B2 of Mo were disposed to form a substrate 2 (segment plate).

Then, another glass substrate 2a was provided with a pattern of scanning electrodes for scanning pixels 100 so as to be in alignment with the display electrodes in similar processes to provide a substrate 2a (common plate). Then, a display area of each of the substrates 2 and 2a was coated with a 1000 Å-thick insulating film of tantalum oxide for preventing short circuit between the substrates and then with a 200 Å-thick polyimide alignment film formed by flexographic printing of a polyimide precursor liquid ("LQ-1803" (trade name), available from Hitachi Kasei K.K.) and baking at 270° C. for 1 hour.

Then, the alignment films on the two substrates were respectively subjected to one time of rubbing in one direction under the conditions of a rubbing roller pressing depth of 0.5 mm and a roller rotation speed of 700 rpm so as to provide a pretilt angle of 20 deg. when assembled.

Then, on one of the two substrates, 1.5 $\mu$m-dia. spacer beads ("Shinshikyu"(trade name), available from Shokubai Kasei K.K.), and the other substrate was superposed thereon so that their rubbing directions were identical to each other, followed by sealing with an adhesive at the periphery of the substrates, followed by curing at 150° C. for 1 hour under pressure to provide a blank panel.

Then, the panel was filled with a pyrimidine-based chiral smectic liquid crystal capable of exhibiting ferroelectricity heated into isotropic phase, followed by sealing of the injection port, 4 hours of heating at 100° C. and gradual cooling to room temperature for providing smectic phase, thereby completing a liquid crystal display panel 1.

The panel was driven so as to provide a display state as illustrated in FIG. 4, in other words a longitudinal line L1 and a lateral line L2 which were displayed in gray close to white on a black background as shown in FIG. 6. As a result, the two lines L1 and L2 provided no width difference and exhibited a very good display quality.

As modifications, a panel having a color pixel arrangement pattern obtained by exchanging the positions of the green color pixel and the blue color pixel in the arrangement of FIG. 2 to place the blue color pixel at the center so as to have a different sub-color pixel arrangement from the other color pixels, and a panel having a color pixel arrangement pattern obtained by exchanging the positions of the green color pixel and the red color pixel in the arrangement of FIG. 2 to place the red color pixel at the center, were prepared and driven for evaluation in the same manner as in the above Example, whereby the best appearance was obtained in the panel of the above Example having the green color pixel at the center as shown in FIG. 2 and the second best appearance was obtained in the panel having the red color pixel in the center.

EXAMPLE 2

In this example, a liquid crystal panel was prepared by using BTN instead of FLC.

More specifically, in this example, two substrates were treated in the same manner as in Example 1 up to the formation of the transparent electrodes. Then, the substrates were respectively provided with a polyimide alignment film (by using a precursor liquid "SE-3140"(trade name), available from Nissan Kagaku K.K.), followed by rubbing in one direction. Then, the two substrates were applied to each other with spacer beads dispersed therebetween so that their rubbing directions were parallel and opposite to each other to form a blank panel having a cell gap of 2.0 $\mu$m.

The panel was filled with a BTN chiral nematic liquid crystal formed by adding a chiral dopant to a nematic liquid crystal composition ("KN-400", available from Chisso K.K.), to prepare a liquid crystal panel.

As a result of driving for displaying a state as shown in FIG. 6, the panel provided a good display quality giving little longitudinal/lateral line width difference.

The above-described embodiments are basically effective for a binary display device using a ferroelectric liquid crystal, a chiral nematic liquid crystal, etc., but they are also applicable to other types of display devices such as a plasma display device.

What is claimed is:

1. A display device comprising a multiplicity of pixels arranged in a matrix of rows and columns, each pixel comprising a plurality of color pixels each divided into a plurality of sub-color pixels having mutually different areas including a larger sub-color pixel and a smaller sub-color pixel, wherein said plurality of sub-color pixels are arranged in the row or column direction so that the order of arrangement of the larger sub-color pixel and the smaller sub-color pixel is different for at least two of said plurality of color pixels in one pixel.

2. A display device according to claim 1, wherein said plurality of color pixels are for displaying three colors, the manners of arrangement of said plurality of sub-color pixels are different for two of the three color pixels, and the manner of arrangement of said plurality of sub-color pixels for the remaining one color pixel is identical to that for either one of the two color pixels.

3. A display device according to claim 2, wherein said plurality of color pixels are color pixels for displaying red, green and blue.

4. A display device according to claim 1, wherein said plurality of color pixels are arranged on a common row, and the arrangement of the sub-color pixels in the column direction is made different for said at least two of the plurality of color pixels.

5. A display device according to claim 4, wherein said plurality of color pixels arranged on the common row are simultaneously selected by application of a scanning selection signal.

6. A display device according to claim 4, wherein said plurality of sub-color pixels for each color pixel include a larger-area sub-color pixel and a smaller-area sub-color pixel, the larger-area sub-color pixels of the respective color pixels are simultaneously selected in a first horizontal scanning selection period, and the smaller-area sub-color pixels of the respective color pixels are simultaneously selected in a second horizontal scanning selection period.

7. A display device according to claim 1, wherein the sub-color pixels are arranged so that, then the respective color pixels are driven to display an identical gradation level, a ratio of a row-direction line width to a column-direction line width becomes larger than 0.6.

8. A display device according to claim 7, wherein the ratio of the row-direction line width to the column-direction line width becomes at least 0.7.

9. A display device according to claim 7, wherein the row-direction line width and the column-direction line width becomes substantially equal to each other.

10. A display device according to claim 1, wherein the display device comprises a plasma display device.

11. A display device according to claim 1, wherein said display device comprises a liquid crystal display device.

12. A display device according to claim 1, wherein each color pixel comprises the plurality of sub-color pixels, a colored filter common to the plurality of sub-color pixels and a plurality of split electrodes each provided to one sub-color pixel.

13. A display device according to claim 1, wherein each pixel has a length and a breadth which are substantially equal to each other.

14. A display device according to claim 1, wherein each color pixel has a length substantially equal to that of the pixel and a breadth which is at most ⅓ of that of the pixel.

15. A display device according to claim 1, wherein the respective color pixels have mutually equal numbers of displayable gradation levels.

16. A display device according to claim 1, wherein said plurality of color pixels include a red color pixel, a green color pixel and a blue color pixel arranged so that the green color pixel is disposed between the red and blue color pixels in the row direction, and the color pixels of each color are arranged on a line in the column direction.

17. A display device according to claim 1, wherein said plurality of color pixels include a red color pixel, a green color pixel and a blue color pixel, the red and blue color pixels have identical sub-color pixel arrangements, and the green color pixel has a sub-color pixel arrangement different from those of the red and blue color pixels.

18. A display device according to claim 1, wherein the sub-color pixels are arranged so that, when the respective color pixels are driven to display an identical gradation level, a ratio of a row-direction line width to a column-direction line width is closer to 1 than the ratio obtained when all the color pixels have an identical sub-color pixel arrangement.

19. A display apparatus, including a display device according to claim 1, and a backlight device disposed integrally behind the display device.

20. A data processing apparatus, including a display apparatus according to claim 19, and a computer to which the display apparatus is connected.

21. A display device comprising a multiplicity of pixels arranged in a matrix of rows and columns, each pixel comprising a plurality of color pixels each divided into a plurality of sub-color pixels having mutually different areas including a larger sub-color pixel and a smaller sub-color pixel, wherein said plurality of sub-color pixels are arranged in the row or column direction so that the order of arrangement of the larger sub-color pixel and the smaller sub-color pixel is different for at least two of said plurality of color pixels in one pixel, and the sub-color pixels are arranged so that, when the respective color pixels are driven to display an identical gradation level, a ratio of a row-direction line width to a column-direction line width is closer to 1 than the ratio obtained when all the color pixels have an identical sub-color pixel arrangement.

22. A display device according to claim 21, wherein said plurality of color pixels are for displaying three colors, the manners of arrangement of said plurality of sub-color pixels are different for two of the three color pixels, and the manner of arrangement of said plurality of sub-color pixels for the remaining one color pixel is identical to that for either one of the two color pixels.

23. A display device according to claim 22, wherein said plurality of color pixels are color pixels for displaying red, green and blue.

24. A display device according to claim 21, wherein said plurality of color pixels are arranged on a common row, and the arrangement of the sub-color pixels in the column direction is made different for said at least two of the plurality of color pixels.

25. A display device, comprising: a pair of transparent substrates, and a liquid crystal disposed between the transparent substrates, wherein at least one of the transparent substrates has thereon a color filter layer including red, blue, and green filters so as to form a multiplicity of pixels each having a set of a red filter, a blue filter and a green filter, each pixel comprises three display electrodes formed on at least one of the transparent substrates in alignment with the red, blue and green filters so as to provide a set of red, blue and green color pixels, each display electrode being divided into a plurality of split electrodes having mutually different areas including a larger split electrode and a smaller split electrode for each color and arranged in a row or column direction; and said pluralities of split electrodes in one display electrode for one color are arranged in an order of the larger split electrode and the smaller split electrode, which order is different from those of the split electrodes in the other display electrodes for the other colors.

26. A display device according to claim 25, wherein the display electrode aligned with the green filter has a different arrangement of the split electrodes from the display electrodes aligned with the red and blue filters.

27. A display device according to claim 1 or 25, wherein said liquid crystal is a ferroelectric liquid crystal.

28. A display device according to claim 1 or 25, wherein said liquid crystal is a bistable nematic liquid crystal.

* * * * *

UNITED STATES PATENT AND TRADEMARK OFFICE
CERTIFICATE OF CORRECTION

PATENT NO. : 5,899,550
DATED : May 4, 1999
INVENTOR(S) : YUICHI MASAKI

Page 1 of 2

It is certified that error appears in the above-identified patent and that said Letters Patent is hereby corrected as shown below:

COLUMN 1

Line 27, "capable" should read --capable of--; and
    Line 62, "to" should read --by--.

COLUMN 2

Line 7, "on-split" should read --split--.

COLUMN 3

Line 56, "a6x6" should read --a 6x6--;
    Line 58, "480pixels" should read --480 pixels--; and
    Line 63, "show" should read --shows--.

COLUMN 4

Line 51, "slit" should read --split--.

COLUMN 5

Line 42, "to display" should read --, it is possible to display--.

COLUMN 6

Line 14, "each" should read --each of the--;
    Line 30, "5G2" should read --5G3--; and
    Line 63, "4R2" should read --4R2,--.

UNITED STATES PATENT AND TRADEMARK OFFICE
CERTIFICATE OF CORRECTION

PATENT NO. : 5,899,550

DATED : May 4, 1999

INVENTOR(S) : YUICHI MASAKI

It is certified that error appears in the above-identified patent and that said Letters Patent is hereby corrected as shown below:

COLUMN 7

Line 15, "an" should read --a--;
    Line 36, "4:2:1similarly" should read --4:2:1 similarly--.

COLUMN 9

Line 60, "becomes" should read --become--.

Signed and Sealed this

Fourteenth Day of December, 1999

Q. TODD DICKINSON

Attesting Officer     Acting Commissioner of Patents and Trademarks